US012633179B2

(12) United States Patent
Welsch et al.

(10) Patent No.: US 12,633,179 B2
(45) Date of Patent: May 19, 2026

(54) METHODS AND SYSTEMS FOR DETERMINING A COUNTERMEASURE TO RESONANCES IN A VEHICLE

(71) Applicant: Aptiv Technologies AG, Schaffhausen (CH)

(72) Inventors: Tim Welsch, Neustadt (DE); Martin Bornemann, Nuremberg (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 106 days.

(21) Appl. No.: 18/653,163

(22) Filed: May 2, 2024

(65) Prior Publication Data

US 2024/0378927 A1 Nov. 14, 2024

(30) Foreign Application Priority Data

May 11, 2023 (EP) .................................... 23172811

(51) Int. Cl.
*G07C 5/08* (2006.01)

(52) U.S. Cl.
CPC ......... *G07C 5/0808* (2013.01); *G07C 5/0816* (2013.01)

(58) Field of Classification Search
CPC . G07C 5/0808; G07C 5/0816; E05Y 2400/32; E05Y 2400/446; E05Y 2400/85; E05Y 2900/55; E05F 15/71; E05F 15/73; G10K 11/161; G10K 11/178; G01H 13/00; B60R 16/0232; G01M 7/02; G06N 20/00
See application file for complete search history.

(56) References Cited

U.S. PATENT DOCUMENTS

| | | | | |
|---|---|---|---|---|
| 2009/0069984 | A1 | 3/2009 | Turner et al. | |
| 2019/0112861 | A1* | 4/2019 | Wheeler | E05F 15/695 |
| 2021/0287459 | A1* | 9/2021 | Cella | G07C 5/0808 |

FOREIGN PATENT DOCUMENTS

| | | | |
|---|---|---|---|
| GB | 2602277 | A | 6/2022 |

OTHER PUBLICATIONS

Extended European Search Report regarding European Patent Application No. 23172811.4, dated Oct. 13, 2023.
"When a Car turns into a Resonance Chamber: A signal analysis case." J. Rey, Pharmaceutical Product Development, dated Nov. 2, 2017.
"Resonant frequency of your car—How to measure," Audio Judgment, dated Jul. 27, 2016.
"Helmholtz Resonance migh be driving you nuts," Scientific Scribblers, dated Oct. 4, 2014.
"The physics of musical instruments," Yves Kemp Lecture, University of Hamburg, Jan. 19, 2010.
"Body oscillation and sound radiation of acoustic Waveguide under Consideration of wall influences and coupling effects," Steffen Bergweiler Dissertatino Nov. 2005.

* cited by examiner

*Primary Examiner* — Michael V Kerrigan
(74) *Attorney, Agent, or Firm* — Harness, Dickey & Pierce, P.L.C.

(57) ABSTRACT

A computer implemented method for determining a countermeasure to resonances in a vehicle comprises the following steps carried out by computer hardware components: determining information related to a status of a vehicle; determining whether resonances occur in the vehicle based on the information; if it is determined that resonances occur in the vehicle, determining a countermeasure to the resonances.

14 Claims, 3 Drawing Sheets

METHODS AND SYSTEMS FOR DETERMINING A COUNTERMEASURE TO RESONANCES IN A VEHICLE

CROSS-REFERENCE TO RELATED APPLICATIONS

This application claims the benefit and priority of European patent application number EP23172811.4, filed on May 11, 2023. The entire disclosure of the above application is incorporated herein by reference.

FIELD

This section provides background information related to the present disclosure which is not necessarily prior art.

The present disclosure relates to methods and systems for determining a countermeasure to resonances in a vehicle.

BACKGROUND

A driver or passengers of a cabin of a vehicle may handle openings, for example to open windows or to open a sliding roof or to set the air/climate to the individual wishes.

However, openings on cavities together with higher airflow, for example due to vehicle speed and/or airspeed, may cause vibrations or resonances that are perceptible and uncomfortable to humans.

Accordingly, there is a need to avoid or reduce such resonances.

SUMMARY

This section provides a general summary of the disclosure, and is not a comprehensive disclosure of its full scope or all of its features.

The present disclosure provides a computer implemented method, a computer system and a non-transitory computer readable medium according to the independent claims. Embodiments are given in the subclaims, the description and the drawings.

In one aspect, the present disclosure is directed at a computer implemented method for determining a countermeasure to resonances in a vehicle, the method comprising the following steps performed (in other words: carried out) by computer hardware components: determining information related to a status of a vehicle; determining whether resonances occur in the vehicle based on the information; and if it is determined that resonances occur in the vehicle, determining a countermeasure to the resonances.

In other words, a countermeasure to potentially occurring resonances may be determined based on a status of the vehicle. This may also include situations where the short term status change is going to lead to resonances, e.g. in case the vehicle is accelerating or changing heading into the wind.

Determining information related to the status of the vehicle and/or determining whether resonances occur in the vehicle based on the information may be carried out if at least one window of the vehicle is not closed; otherwise, the information may not be determined and it may not be determined whether resonances occur.

The countermeasure may be determined based on the information related to the status of the vehicle.

The information may be information related to the present status of the vehicle (which may for example be used to reduce or end resonances presently occurring) or related to a potential future status of the vehicle (which may for example be used to determine whether resonances will or would occur with the potential future status). The future status may for example include a status which would occur if a user request, for example to open a window, would be accepted and executed.

According to an embodiment, the resonances are determined using a physics model of the vehicle. The physics model may for example model the resonance formula of an acoustic Helmholtz resonator, and may be extended by properties of the vehicle. For example, a physics model of the vehicle may be adjusted to the present status to determine whether presently resonances occur. In another example, the physics model of the vehicle may be adjusted to a future status to determine whether resonances will or would occur in the future, for example if a window would be opened. Likewise, the countermeasures may be determined using a physics model of the vehicle, for example using an explicit formula for determining a countermeasure, or using a set of rules for determining a countermeasure.

According to an embodiment, the resonances are determined using an empirical model. For example, knowledge that has been observed during driving a vehicle in various states (for example with various combinations of window positions at various speeds), may be used to define situations in which resonances occur. For example, this knowledge may be represented by a database in which for each combination of vehicle states, information is provided as to whether or not (or with which likelihood or probability) resonances occur. For vehicle states that are not explicitly provided in the database, interpolation may be provided between vehicle states for which data is available in the database.

According to an embodiment, the resonances are determined using a trained machine learning method. The machine learning method may be trained using training data which include various different status of the vehicle (for example with different window positions, different vehicle or air speeds) and corresponding ground truth data indicating whether resonances occur or not for the respective status. Likewise, the countermeasures may be determined using a trained machine learning method.

According to an embodiment, the resonances may be determined using a digital twin of the vehicle. For example, a digital twin model of the vehicle may be provided in a computer system, and every change in a status of the real vehicle may be replicated in the model (in other words: the digital twin model may use real-time status updates). The digital twin model may then be used to determine whether resonances occur, and to determine countermeasures to the resonances. The digital twin model may allow simulation of various scenarios, for example in order to predict what would happen if a specific action (for example acceleration of the vehicle, or opening or closing of a specific windows of the vehicle) would occur. The digital twin of the vehicle may include a physics model of the vehicle (for example the physics model of the vehicle as described above).

According to an embodiment, the information related to the status of the vehicle comprises information on an opening status of at least one window (for example side window or roof window) of the vehicle. The opening status may be "open" or "closed", or may include positional information of the window, for example a percentage between a closed position and an open position.

According to an embodiment, the information related to the status of the vehicle comprises information on a load situation of the vehicle. The load situation may for example include a load weight, a load distribution (for example front-rear load distribution, or left-right load distribution), or a volume of the cabin occupied by load.

According to an embodiment, the information related to the status of the vehicle comprises information on the number of occupants (for example driver and/or passengers) in the vehicle, and/or information on where (for example on which seats) the occupants are seated. Based on the information, for example a location of a maximum of a standing wave of an oscillation may be moved to an non-populated location of the vehicle, e.g. an empty seat.

According to an embodiment, the information related to the status of the vehicle comprises information on a speed of the vehicle and/or information on an airspeed or airspeed-vector outside the vehicle. Instead of speed and airspeed, also the relative speed of the vehicle with respect to the air outside the vehicle may be provided as the information related to the status of the vehicle.

According to an embodiment, the information related to the status of the vehicle comprises information acquired by one or more microphones of the vehicle. For example, information on a frequency of oscillations or resonances may be determined based on the audio information acquired by the microphones.

According to an embodiment, the countermeasure is determined so that resonances are minimized, for example so that resonances do not occur at all.

According to an embodiment, more than one countermeasure to the resonances may be determined, for example so that resonances are minimized.

According to an embodiment, the countermeasure comprises an action and a level of that action. The action may for example include or may be changing a window position (and the level may be to which extent the window is moved), and/or providing output using an audio system (and the level may be information on an amplitude and/or a phase of the output) and/or providing mechanical control of airflow guide parts (and the level may be the extent to which the airflow guide parts are moved) and/or changing a speed of the vehicle, for example for an autonomously driving vehicle (and the level may be the amount of change of the speed) and/or providing information on a desired speed to the driver (and the level may be the desired speed).

According to an embodiment, the countermeasure comprises not accepting a user request and/or providing a warning to the user in response to a user request and/or asking for user confirmation in response to a user request. The warning may be an optical warning, an acoustical warning, or a haptic warning. The user request may for example be a request to change window status (for example open window or close window). According to an embodiments, when the user request is repeated despite the warning, the user request may be accepted and executed.

In another aspect, the present disclosure is directed at a computer system, said computer system comprising a plurality of computer hardware components configured to carry out several or all steps of the computer implemented method described herein. The computer system can be part of a vehicle.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at vehicle, comprising the computer system described herein.

In another aspect, the present disclosure is directed at a non-transitory computer readable medium comprising instructions which, when executed by a computer, cause the computer to carry out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Exemplary embodiments and functions of the present disclosure are described herein in conjunction with the following drawings, showing schematically:

Corresponding reference numerals indicate corresponding parts throughout the several views of the drawings.

DETAILED DESCRIPTION

Example embodiments will now be described more fully with reference to the accompanying drawings.

A driver or passengers of a cabin of a vehicle may handle openings, for example to open windows or to set the air/climate to the individual wishes.

However, openings together with higher airflow, for example due to vehicle speed and/or airspeed, may cause vibrations or resonances that are perceptible and uncomfortable to humans.

By opening one part of the vehicle chassis during driving, for example the side windows or a roof window, the cabin may act as an organ pipe. More particularly, the cabin may build an acoustic Helmholtz resonator driven by labial cutting the airflow through the door-frame (for example through the window). If the windspeed is high enough, a resonant wave may stabilize in the cabin. This is usually unwanted and may even cause pain to the passengers. As vehicles on higher speed may have very high excitation energy in the outside airflow available, those subsonic waves may also reach levels that cause strong irritation or even harm to drivers and passengers and diminish the drivers capability in controlling the vehicle.

According to various embodiments, methods and systems are provided to avoid or reduce such unwanted cabin resonances.

According to various embodiments, unwanted and sometimes highly disturbing cabin sound resonances on low frequencies caused by airflow at open windows during driving may be reduced or avoided by analyzing the physical resonance system and its current constrains, by identifying an appropriate set of countermeasures and by applying these countermeasures using actor systems.

By analysis of the vehicle status (in other words: vehicle situation and available data), the method and system according to various embodiments may predict if such resonance will occur when changing a window position and how strong the resonance will be. As countermeasures, other cabin openings, e.g. side windows or roof window, may be adjusted to change the resonance capability, or a manual opening may be blocked entirely (for example a first attempt of a user to open the window manually may be blocked).

A libal oscillating system, which may be the cause for the resonances, may be complex and may interfere with all other air-stream/pressure physics in the cabin, so that also an action with relative low sound energy generated by the cabin sound system may control or suppress the window-libal oscillation.

A modern vehicle may have much situational knowledge and may also have a smart-vehicle-architecture, so that various information related to a status of the vehicle may be available, including information on various sensors and actors.

Figure 1:
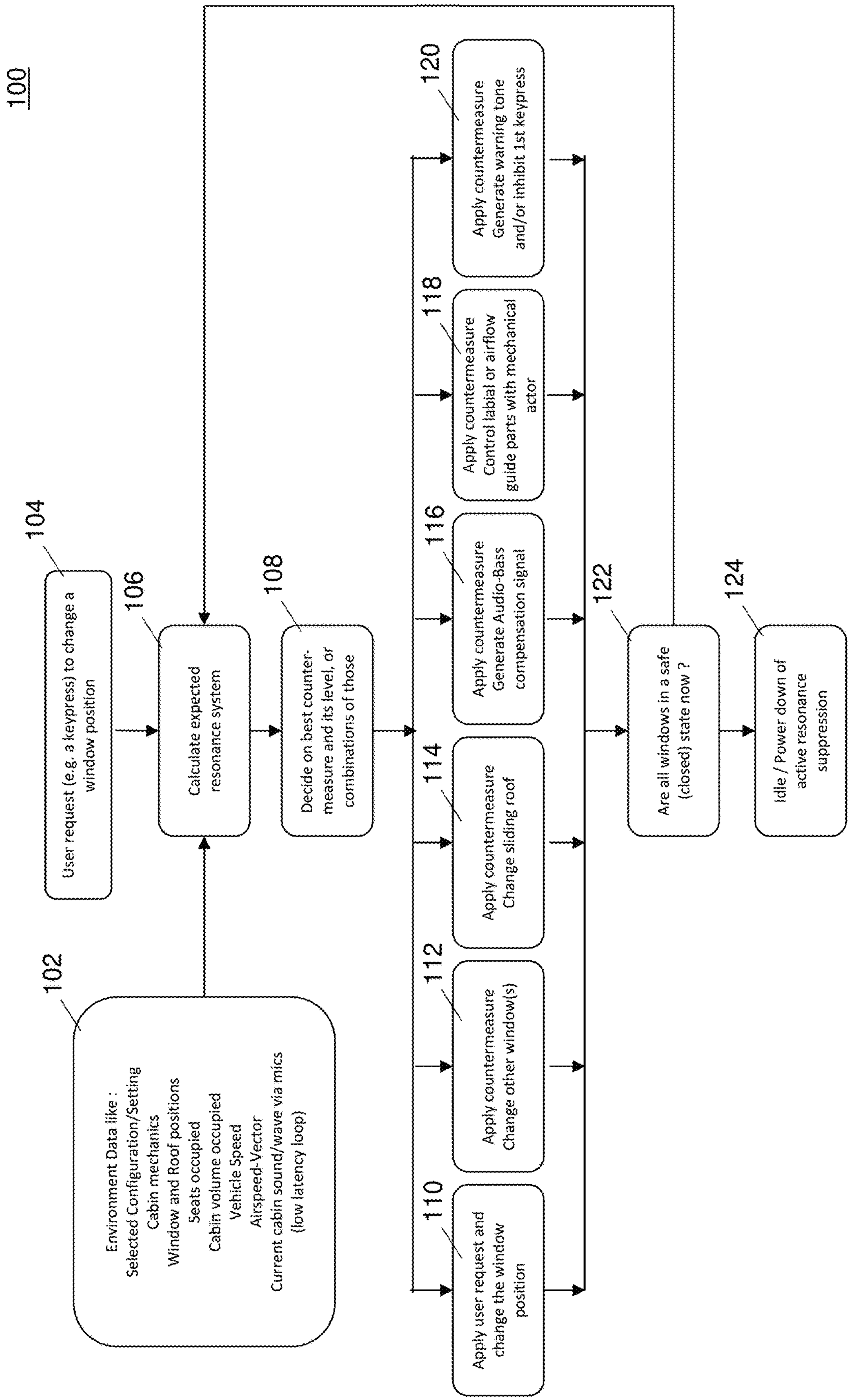
FIG. 1 is an illustration of a flow diagram illustrating a method for determining a countermeasure to resonances in a vehicle according to various embodiments.

FIG. 1 shows a flow diagram illustrating a method for determining a countermeasure to resonances in a vehicle according to various embodiments.

At 102, environment data (in other words: information related to a status of the vehicle) may be determined. For example, the current situation may be analyzed (for example regarding seats occupied, status on all windows and sliding roof (for example window and roof positions), vehicle speed, airspeed-vector (for example apparent airflow-vector), measured cabin sound by existing microphones, vehicle chassis model and interieur information, selected configuration/setting by the users on how the countermeasure shall react at all, cabin mechanics/config (e.g. what kind of actors are available in that vehicle at all), cabin volume occupied by people and load, low latency data of microphones (that allows a loop-regulator).

At 104, a user request (for example a keypress) to change a window position may be received.

At 106, an expected resonance system (for example a resonance system which would be present if the user request would be followed, for example if the position of the window would be changed according to the user request), may be determined.

At 108, a best countermeasure and the level of the countermeasure (or a combination of more than one countermeasures) may be determined. The user selected configuration and settings may influence this determination process.

At 110, if it is determined that no resonances will occur, the user request may be applied (in other words: followed), and the window position may be changed according to the user request.

If it is determined that resonance will occur, a countermeasure may be taken. Various countermeasures are illustrated in 112, 114, 116, 118, and 120.

As illustrated in 112, 114, 116, settings for windows and/or sliding roof and/or in-vehicle sound system may be determined to reach minimum resonance levels or to get even out of the resonance. The people's sound impression may depend also on the seat and head position within the cabin. For example, the (unused) windows or the roof window may be used to quickly countermeasure or inhibit the resonance impression. The vehicle sound bass system may be used in addition with phase control to countermeasure the resonance impression.

As illustrated in 118, an actor at the libal may be used to eliminate the resonance at the origin/control. "Libal" in this context may be understood as the mechanical part that is responsible to cut the airflow in two parts. For example, the libal may be an elastic lib at the rear side of the window-opening. Alternatively, the airflow blade of the sliding-roof might be modulated with a separate mechanical actor.

As illustrated in 120, the analysis may be used to generate a warning before the window opens after the manual control wish trigger (in other words: after the user request).

At 122, it may be determined whether all windows are in a safe (for example in a closed) state. If it is determined that at least one window is not in a safe state, processing may return to 106; otherwise, processing may continue in 124. Using the loop between steps 106 and 122, the actions may be repeated in a closed-loop if needed, until the user closes or manually changes the window position again.

At 124, the system may be in an idle state; for example, active resonance suppression as described herein may be powered down.

According to various embodiments, not only the stable resonance case may be considered, but also the pressure drift at first opening and final closure of a side window at high speed. Such a pressure change may create harm to several passengers. As countermeasure, for example a manual open trigger of the driver window may lead to an automated controlled gap-opening of other windows or the roof of the vehicle to avoid those strong acoustic/pressure effects.

According to various embodiments, ventilation may be controlled. For example, a fan-engine may be modulated to create pressure oscillation, or to generate forced continuous airflow out of the windows by pushing air into the vent in order to move the air-libal arbitration point to a different location.

According to various embodiments, determination whether resonances will occur may be carried before changing a status of the vehicle (for example before opening a window). Alternatively, determination whether resonances occur may be determined after the change of the status of the vehicle has already been carried out (for example after the window has been opened).

In order to determine resonances (and thus, to determine whether resonances are presently occurring), one or more of the following may be carried out: resonances may be determined by one or multiple microphones installed in the cabin; resonances may be determined by the microphone of a nomadic device, for example a smartphone or a tablet device, that the passenger/driver brought into the vehicle and an audio signal acquired by the nomadic device may be transferred to the vehicles computer via usual communication paths, for example WLAN (wireless local area network) or BT (Bluetooth); resonances may be determined by one or multiple accelerometers installed at the vehicle chassis component, which may record low frequency cabin resonance.

A propagation path of resonances may be determined by comparing the signals and phases gathered from multiple microphones or accelerators used in above embodiments. This may allow determination of the origin/source of the resonance, which may allow for more precise/effective countermeasures.

Information from a road-noise-cancellation (RNC) system may be used to determine resonances.

Determination of countermeasures before or after changing a status of the vehicle, may depend on user preferences, and/or capabilities of the vehicle chassis and/or driving modes and/or a driving situation.

As a countermeasure to resonances, a vehicle which is operated by a self-driving system or by an adaptive cruise system, may reduce the speed below a limit where the resonances decrease to an acceptable low level before the window open wish is executed, or when the window is opened (depending on user preference configuration). After the window is closed, the original (for example normal) speed may be set again.

As a countermeasure to resonances, a vehicle which is operated by a self-driving system or by an adaptive cruise system may position itself in an advantage slipstream by adjusting the distance to the front driving vehicle or changing the lane.

For vehicles which are neither self-driving nor using an adaptive cruise system, a suggestion for a driving operation to be carried out by the driver may be provided (for example to set a specific speed or to move to a specific location relative to a vehicle in front).

As a countermeasure to resonances, a vehicle which is operated by a four-wheel steering system may rotate the chassis slightly to a position in an improved airflow angle compared to the window opening.

As a countermeasure to resonances, a vehicle may change its ventilation setting, for example to create a high airflow into the cabin and out of the openings. If the ventilation system has fast enough dynamics in fans or blades, it may also add phase controlled low frequency pressure waves into the cabin.

As a countermeasure to resonances, a vehicle may use libal control at the window corners, for example in setting them to a determined level using speed information, or control them dynamically in phase if they are fast enough.

In order to avoid strong pressure gaps when a window is opened, the vehicle may slow down the opening speed at the initial phase of opening the window, or other windows may be used for creating more gaps synchronously.

According to various embodiments, the vehicle may warn passengers or the driver of impending resonances. For example in case resonances are expected soon in an ongoing acceleration, a warning may be provided to the passengers or the driver of the vehicle. The warning may be an optical warning or an acoustic warning or a haptic warning.

Figure 2:
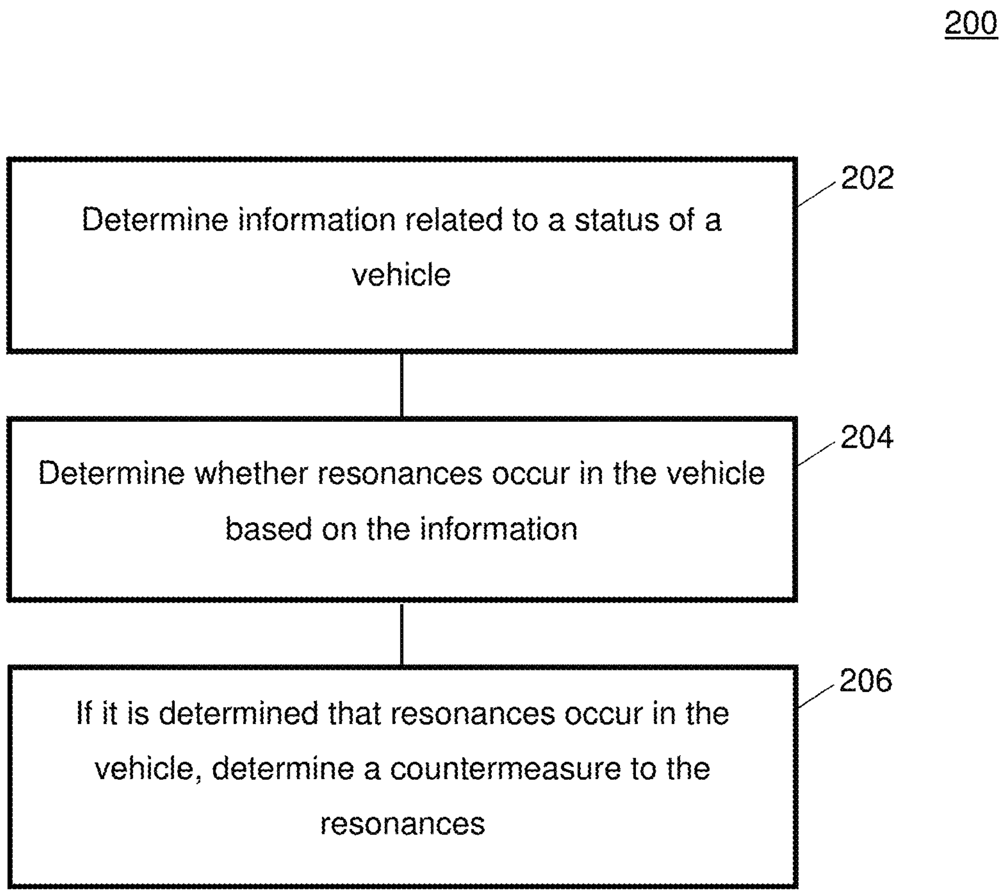
FIG. 2 is an illustration of a flow diagram illustrating a method for determining a countermeasure to resonances in a vehicle according to various embodiments.

FIG. 2 shows a flow diagram 200 illustrating a method for determining a countermeasure to resonances in a vehicle according to various embodiments. At 202, information related to a status of a vehicle may be determined. At 204, it may be determined whether resonances occur in the vehicle based on the information. If it is determined at 204 that resonances occur in the vehicle, a countermeasure to the resonances may be determined at 206.

According to various embodiments, the countermeasure could be a speed change of the vehicle, especially in case the speed is controlled by automatic cruise control or L3+ autonomous driving.

According to various embodiments, the countermeasure could be an automatic closure or lifting of the window(s) according to an increasing speed/acceleration of the vehicle, also an automatic re-open may occur if this was selected by the user setting.

According to various embodiments, the resonances may be determined using a physics model of the vehicle.

According to various embodiments, the resonances may be determined using a trained machine learning method.

According to various embodiments, the resonances may be determined using a digital twin of the vehicle.

According to various embodiments, the information related to the status of the vehicle may include or may be information on an opening status of at least one window of the vehicle.

According to various embodiments, the information related to the status of the vehicle may include or may be information on a load situation of the vehicle or may be information on a volume load situation of the vehicle.

According to various embodiments, the information related to the status of the vehicle may include or may be information on the number of occupants in the vehicle.

According to various embodiments, the information related to the status of the vehicle may include or may be information on a speed of the vehicle and/or information on an airspeed vector outside the vehicle.

According to various embodiments, the information related to the status of the vehicle may include or may be information acquired by one or more microphones of the vehicle.

According to various embodiments, the countermeasure may be determined so that resonances are minimized.

According to various embodiments, the countermeasure may include or may be an action and a level of that action.

According to various embodiments, the countermeasure may include or may be not accepting a user request and/or providing a warning to the user in response to a user request and/or asking for user confirmation in response to a user request.

Each of the steps 202, 204, 206, and the further steps described above may be performed by computer hardware components.

Figure 3:
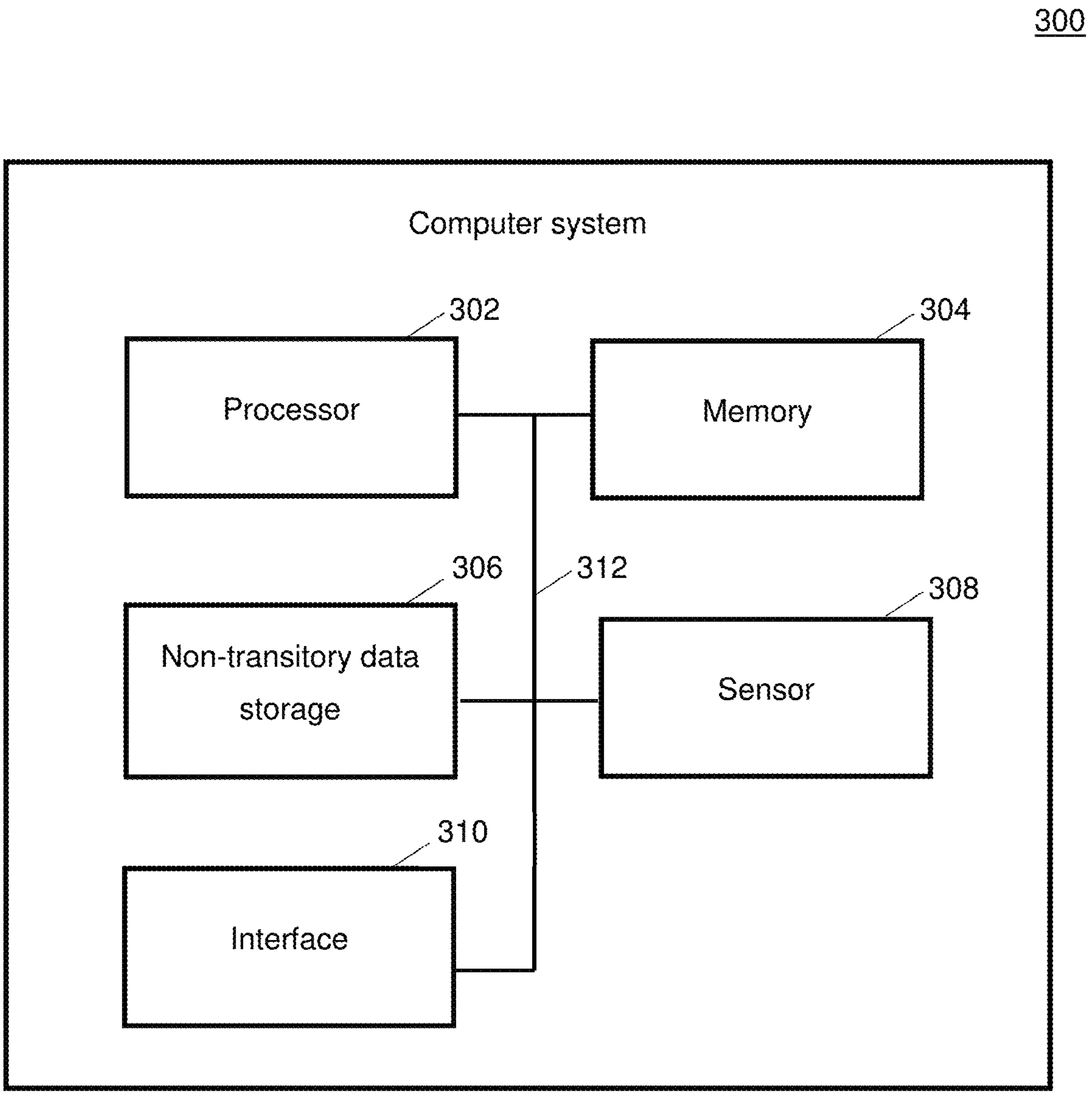
FIG. 3 is an illustration of a computer system with a plurality of computer hardware components configured to carry out steps of a computer implemented method for determining a countermeasure to resonances in a vehicle according to various embodiments.

FIG. 3 shows a computer system 300 with a plurality of computer hardware components configured to carry out steps of a computer implemented method for determining a countermeasure to resonances in a vehicle according to various embodiments. The computer system 300 may include a processor 302, a memory 304, and a non-transitory data storage 306. A sensor 308 may be provided as part of the computer system 300 (like illustrated in FIG. 3), or may be provided external to the computer system 300. An interface 310 to an actor may be provided.

The processor 302 may carry out instructions provided in the memory 304. The non-transitory data storage 306 may store a computer program, including the instructions that may be transferred to the memory 304 and then executed by the processor 302. The sensor 308 may be used for determining information related to a status of a vehicle. The interface 310 may provide an interface to one or more actors of the vehicle, so that the countermeasure may be executed.

Instead of the interface 310 (or in addition to the interface 310), the actor itself may be provided as part of the system 300 (not shown in FIG. 3).

The processor 302, the memory 304, and the non-transitory data storage 306 may be coupled with each other, e.g. via an electrical connection 312, such as e.g. a cable or a computer bus or via any other suitable electrical connection to exchange electrical signals. The sensor 308 may be coupled to the computer system 300, for example via an external interface, or may be provided as parts of the computer system (in other words: internal to the computer system, for example coupled via the electrical connection 312). The interface 310 (or the actor) may be coupled to the computer system 300, for example via an external interface, or may be provided as parts of the computer system (in other words: internal to the computer system, for example coupled via the electrical connection 312).

The terms "coupling" or "connection" are intended to include a direct "coupling" (for example via a physical link) or direct "connection" as well as an indirect "coupling" or indirect "connection" (for example via a logical link), respectively.

REFERENCE NUMERAL LIST

100 flow diagram illustrating a method for determining a countermeasure to resonances in a vehicle according to various embodiments
102 environment data
104 user request
106 calculate expected resonance system
108 decide on best countermeasure
110 apply user request
112-120 counter measures
122 determination whether all windows are closed
124 idle state
200 flow diagram illustrating a method for determining a countermeasure to resonances in a vehicle according to various embodiments
206 step of determining information related to a status of a vehicle
206 step of determining whether resonances occur in the vehicle based on the information
206 step of, if it is determined that resonances occur in the vehicle, determining a countermeasure to the resonances
300 computer system according to various embodiments
302 processor
304 memory
306 non-transitory data storage
308 sensor
310 interface
312 connection

What is claimed is:

1. A computer implemented method for determining a countermeasure to resonances in a vehicle,
the method comprising the following steps carried out by computer hardware components:
determining information related to a status of a vehicle;
determining whether resonances occur in the vehicle based on the information; and
if it is determined that resonances occur in the vehicle, determining a countermeasure to the resonances,
wherein the countermeasure comprises not accepting a user request and/or providing a warning to the user in response to a user request and/or asking for user confirmation in response to a user request.

2. The computer implemented method of claim 1, wherein the occurrence of resonances is determined using a physics model of the vehicle.

3. The computer implemented method of claim 1, wherein the occurrence of resonances is determined using a trained machine learning method.

4. The computer implemented method of claim 1, wherein the occurrence of resonances is determined using a digital twin of the vehicle.

5. The computer implemented method of claim 1, wherein the information related to the status of the vehicle comprises information regarding an opening status of at least one window of the vehicle.

6. The computer implemented method of claim 1, wherein the information related to the status of the vehicle comprises information regarding a load situation of the vehicle and/or information regarding a volume load situation of the vehicle.

7. The computer implemented method of claim 1, wherein the information related to the status of the vehicle comprises information regarding a number and/or localization of occupants in the vehicle.

8. The computer implemented method of claim 1, wherein the information related to the status of the vehicle comprises information regarding a speed of the vehicle and/or information regarding an airspeed of the vehicle and/or information regarding an airspeed vector outside the vehicle.

9. The computer implemented method of claim 1, wherein the information related to the status of the vehicle comprises information acquired by at least one microphone of the vehicle.

10. The computer implemented method of claim 1, wherein the countermeasure is determined so that resonances are minimized.

11. The computer implemented method of claim 1, wherein the countermeasure comprises an action and a level of that action.

12. A non-transitory computer readable medium comprising instructions for carrying out the computer implemented method of claim 1.

13. A computer system comprising a plurality of computer hardware components configured to:
determine information related to a status of a vehicle;
determine whether resonances occur in the vehicle based on the information; and
if it is determined that resonances occur in the vehicle, determine a countermeasure to the resonances;
wherein the countermeasure comprises not accepting a user request and/or providing a warning to the user in response to a user request and/or asking for user confirmation in response to a user request.

14. The vehicle of claim 13 including the computer system.

* * * * *